United States Patent Office
3,238,230
Patented Mar. 1, 1966

3,238,230
FLUORINATED PHENYL AZIDES
Robert Neville Haszeldine, Windyridge, Lyme Road, Disley, England; Alan Richard Parkinson, Deane, Bolton, England (340 Huddleston Ave., Cuyahoga Falls, Ohio); and John Michael Birchall, 22 Lorna Road, Cheadle Hulme, England
No Drawing. Filed Nov. 1, 1963, Ser. No. 320,820
Claims priority, application Great Britain, Nov. 6, 1962, 41,920/62
6 Claims. (Cl. 260—349)

This invention relates to highly fluorinated aromatic azides and particularly perfluorinated aromatic azides.

The compounds of the invention may be represented by the general formula:

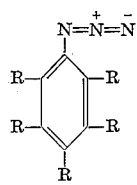

where R is selected from the class consisting of fluorine, alkyl, perfluoroalkyl, phenyl and perfluorophenyl radicals and where at least four of said R substituents are fluorine. When one of the R substituents is alkyl or perfluoroalkyl it is preferably lower alkyl or perfluoroalkyl, i. e., having from 1 to about 6 and preferably 1 to 3 carbon atoms. When one of the R substituents is other than fluorine, it will generally be in a position ortho or para to the azide group.

Examples of preferred compounds are:

(I) Pentafluorophenyl azide, $C_6F_5N_3$

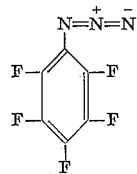

(II) 2-isopropyl-tetrafluorophenyl azide $C_6F_4(C_3H_7)N_3$

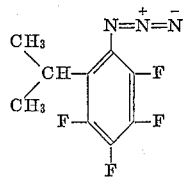

(III) 4 - perfluoromethyl - tetrafluorophenyl azide $C_6F_4(CF_3)N_3$

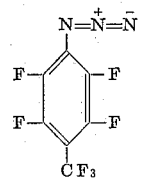

(IV) 2-phenyl-tetrafluorophenyl azide $C_6F_4(C_6H_5)N_3$

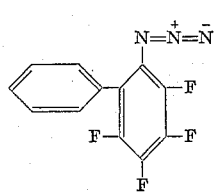

(V) 4 - pentafluorophenyl - tetrafluorophenyl azide $C_6F_4(C_6F_5)N_3$

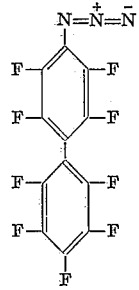

(VI) 4-phenyl-tetrafluorophenyl azide $C_6F_4(C_6H_5)N_3$

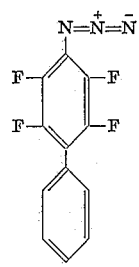

(VII) 4-isopropyl tetrafluorophenyl azide
$C_6F_4(C_3H_7)N_3$

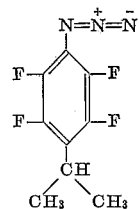

The fluorinated aromatic azides of the invention may be prepared by the reaction of a corresponding hydrazine, i.e. a hydrazine of the formula:

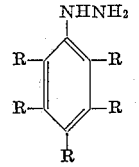

where R is as defined above and where at least four of the R substituents are fluorine with a compound giving rise to a nitrosyl ion. The nitrosyl generating compound is preferably an inorganic compound such as nitrous acid, a nitrosyl halide or dinitrogen trioxide ($N_2O_3$).

When nitrous acid is employed as the nitrosyl producing reagent, it may be conveniently generated from a nitrite, preferably sodium nitrite or potassium nitrite, and an acid such as hydrochloric acid or some other, preferably non-oxidizing mineral acid such as hydrobromic, hydrofluoric or sulfuric acid. When using nitrous acid, the reaction temperature should be held below 10° C. and preferably below 5° C. to obtain good conversions to the desired product and to minimize the formation of undesired by-products. Temperatures of —5° C. to 0° C. are generally preferred. A preferred procedure when employing nitrous acid is to dissolve the aromatic hydrazine in an excess of aqueous mineral acid, e.g., 5 to 10 moles of, e.g., 2 N to 7 N acid per mole of hydrazine, and after cooling to about 0° C. adding an aqueous solution of a nitrite, e.g. sodium or potassium nitrite while stirring. The nitrite is employed in slight molar excess over the hydrazine, e.g., 1.1 to 1.5 moles of nitrite per mole of hydrazine and is preferably added as a 2 N to 7 N aqueous solution. After stirring the reaction mixture at about 0° C. for, e.g., ½ to 3 hours, it is then extracted with ether or some other low-boiling inert slovent such as light petroleum ether. The azide is recovered by evaporation of the solvent taking care to avoid temperatures above 50° C. because of the explosive nature of the azide. Removal of the solvent by evaporation under reduced pressures and at correspondingly reduced temperatures is preferable.

When using nitrosyl halides, such as nitrosyl chloride, as the source of nitrosyl ion, the fluorinated aromatic hydrazine is preferably dissolved in a concentration of, e.g., 1 to 5 moles per liter in a polar organic solvent such as glacial acetic acid or diethyl ether which does not react appreciably with the nitrosyl halide whereupon the nitrosyl halide is passed through the solution in a slow stream. An excess of nitrosyl halide, e.g., 1 to 10 moles and preferably of the order of two moles of nitrosyl halide per mole of hydrazine, is desirable. Reaction temperatures below 100° C. should be used and temperatures from 20 to 50° C. are preferred to minimize the danger of explosion. The azide may be recovered e.g. by diluting with water and steam distilling. Final purification by distillation if any, should be carried out cautiously at temperatures below 50° C. to avoid the danger of explosion.

The precursor fluorinated aromatic hydrazine may be prepared by reaction of hydrazine hydrate with a corresponding fluorinated aromatic compound of the formula

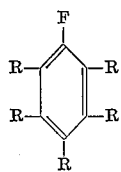

where R is as defined above and where at least four of the R substituents are fluorine. The reaction is carried out in an organic solvent such as ethanol or dioxane at reflux for, e.g., 2–15 hours. From a formal standpoint, one of the fluorines on the phenyl ring is replaced by the hydrazino (—NH—NH$_2$) group. Starting materials for the preparation of the hydrazine derivative where one of the R substituents is a hydrocarbon phenyl radical (such as 2,3,4,5,6-pentafluorodiphenyl C$_6$H$_5$—C$_6$F$_5$) are now compositions of matter the preparation of which is described in copending application Ser. No. 223,266, filed September 12, 1962, by R. N. Haszeldine, A. R. Parkinson and J. M. Birchall.

The following examples illustrate several specific embodiments of the invention.

Example 1

A solution of 4.85 grams (24.5 millimoles) of pentafluorophenyl-hydrazine in 50 millimeters of 5 N aqueous hydrochloric acid is prepared. After cooling to 0°–5° C. ten milliliters of diethyl ether is added. To the vigorously stirred mixture there is slowly added 1.8 grams (26 millimoles) of sodium nitrite dissolved in 6 milliliters of water. The mixture is maintained at 0°–5° C. for an additional hour and then extracted with three ten milliliter portions of diethyl ether. The combined ether extracts are dried over anhydrous magnesium sulfate and the ether is removed by evaporation at room temperature and reduced pressure (380 mm. Hg) in a stream of dry nitrogen. The residue is distilled at 5 mm. Hg to give 2.5 grams of a yellow oil which is shown to contain pentafluoroaniline as an impurity by infrared spectroscopy. To remove the pentafluoroaniline, the yellow oil is dissolved in 25 milliliters of diethyl ether and dry hydrogen chloride is passed into the ethereal solution for 15 minutes; the solution is then filtered to remove the pentafluoroaniline as its hydrochloride, the ether is evaporated as described above and distillation of the residue at 5 mm. Hg gives yellow pentafluorophenyl azide,

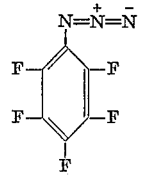

in 30% yield boiling at 350° C. at 5 mm. Hg.

*Analysis.*—Calculated for C$_6$F$_5$N$_3$: C, 34.5; N, 20.1. Found: C, 34.8; N, 19.5. This compound shows strong absorption in the infrared spectrum at 2128 and 2198 cm.$^{-1}$ attributed to the azide function and at 1515 cm.$^{-1}$ attributed to the aromatic ring vibration.

Example 2

A slow stream of nitrosyl chloride (about 2 grams in all) is passed into a stirred solution of 6.0 grams of pentafluorophenyl hydrazine in 20 milliliters of glacial acetic acid at room temperature. Reaction begins immediately and continues for about 2 hours, the solution gradually becoming deep red. The solution is left open to the atmosphere for 14 hours, then heavily diluted with water and steam distilled. The organic distillate is washed with water and 2 N aqueous sodium carbonate, dried over anhydrous magnesuim sudfate and distilled to give a 52% yield of pentafluorophenyl azide boiling at 35° C. at 5 mm. Hg and identified by its infrared spectrum.

Example 3

4-phenyl tetrafluorophenyl hydrazine is prepared by the reaction of 2,3,4,5,6-pentafluorodiphenyl with hydrazine hydrate in refluxing dioxane. The precursor 2,3,4,5,6-pentafluorodiphenyl is prepared as described in copending application Serial No. 223,266 of Haszeldine et al. The crystalline hydrazine is dissovled in 5 N aqueous hydrochloric acid to which a molar excess (based on the hydrazine) of sodium nitrite in aqueous solution is added while maintaining the reaction temperature at about 0° C. Following the procedures of Example 1 the azide, 4-phenyl-tetrafluorophenylazide, $$\text{N}=\overset{+}{\text{N}}=\overset{-}{\text{N}}$$

[structure: tetrafluorophenyl ring with phenyl substituent]

is recovered in moderate yield.

Example 4

Nonafluorodiphenyl hydrazine is prepared by the reaction of decafluorodiphenyl with hydrazine hydrate in refluxing dioxane. Following the procedures of Example 1 the hydrazine is reacted in aqueous HCl with sodium nitrite to provide the azide 4-pentafluorophenyl-tetrafluorophenyl azide:

[structure: F F / F F biphenyl with N=N=N]

Example 5

4-perfluoromethyl pentafluorophenyl hydrazine is prepared by the reaction of perfluorotoluene in refluxing dioxane with hydrazine hydrate. The crystalline hydrazine is converted to the azide by reaction with nitrous oxide generated by the addition of sodium nitrite to a solution of the hydrazine in aqueous HCl in accordance with the procedures of Example 1. There is obtained the corresponding azide 4-perfluoromethyltetrafluorophenyl azide.

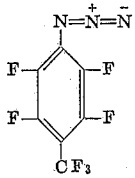

*Example 6*

4-isopropyl tetrafluorophenyl hydrazine is prepared by the reaction of isopropyl pentafluorobenzene with hydrazine hydrate in refluxing dioxane. The precursor isopropyl pentafluorobenzene B.P. 100° C. is prepared by addition of a small excess of isopropyl lithium in diethylether to hexafluorobenzene in diethylether at −40° C. under an atmosphere of nitrogen.

Following the procedures outlined in Example 1, the hydrazine is dissolved in aqueous HCl to which a slight molar excess (based on the hydrazine) of sodium nitrite dissolved in water is added. 4-isopropyltetrafluorophenyl azide,

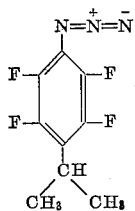

is obtained in moderate yield.

*Example 7*

2-phenyltetrafluorophenylhydrazine is dissolved in 5 N aqueous hydrochloric acid to which a molar excess (based on the hydrazine) of sodium nitrite in aqueous solution is added while maintaining the reaction temperature at about 0° C. Following the procedures of Example 1 the azide, 2-phenyltetrafluorophenyl azide

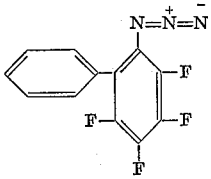

is recovered in moderate yield.

The highly fluorinated aromatic azides have properties which are greatly different from those of their hydrocarbon analogs. They are in general far more stable and much less explosive. Moreover, while the hydrocarbon analogs are destroyed by electrophilic reagents, and are not attacked by nucleophilic reagents, the highly fluorinated aromatic azides of the invention react with nucleophilic reagents to give a range of compounds, which are useful synthetic intermediates. For example, the fluorine atoms on the aryl group of the compounds of the invention may be replaced by hydroxyl, e.g., by the attack of KOH in tertiary butyl alcohol; or by alkoxy by the attack of alkoxides in alcohols; or by dialkylamino by the attack of dialkylamines on heating, or by mercapto such as by the attack of sodium sulfhydrate (NaSH) in pyridine; or by the hydrazine radical —NH—NH$_2$ such as by the attack of hydrazine hydrate in refluxing ethanol or dioxane. Such reagents produce essentially no attack on the corresponding hydrocarbon aryl azides.

The compounds of the invention are highly useful intermediates for the preparation of the fluorinated analogs of many nitrogen heterocyclic compounds having well known uses as dye intermediates, pharmaceutical intermediates and the like, the fluorinated analogs being useful for the preparation of corresponding fluorinated dyes and pharmaceuticals of modified properties. Thus 2-phenyltetrafluorophenyl azide can be converted to the tetrafluoro derivative of the important dye intermediate carbazole by irradiation with ultraviolet light in accordance with the following:

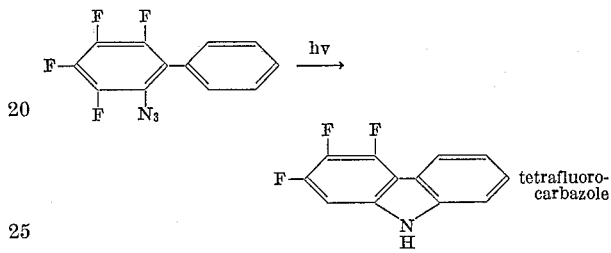

Similarly 2-isopropyl-tetrafluorophenyl azide can be converted by ultraviolet light irradiation to 4,5,6,7-tetrafluoro-2,3-dihydro-3-methylindole which in turn can be oxidized to 4,5,6,7-tetrafluoro-3-methylindole as follows:

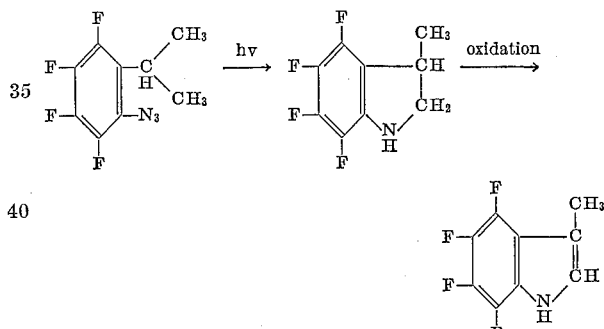

Pentafluorophenyl azide, by heating with acetylene in acetone can be converted to the pentafluorophenyl derivative of triazole thus:

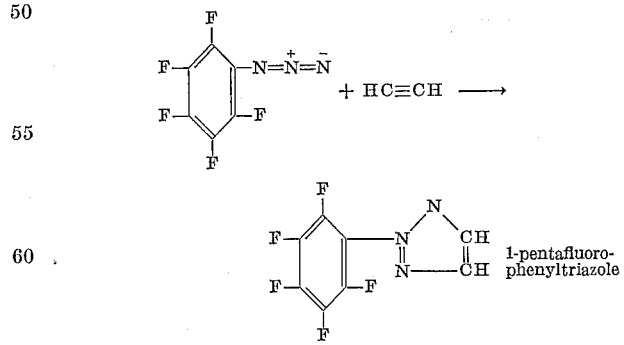

Similarly pentafluorophenyl azide can be reacted with quinone under ultraviolet light irradiation to provide N-pentafluorophenylcycloaminobenzoquinone as follows:

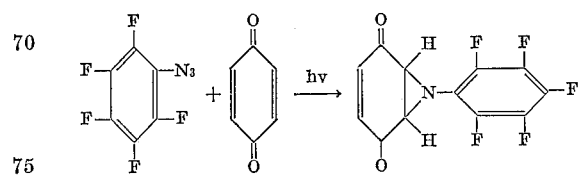

We claim:
1. A compound of the formula:

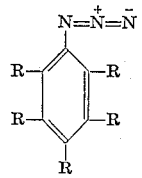

where R is a substituent selected from the class consisting of fluorine, alkyl having 1 to 6 carbon atoms, perfluoroalkyl having 1 to 6 carbon atoms, phenyl and perfluorophenyl and where at least four of said R substituents are fluorine.

2. A compound according to claim 1 where one of the R substituents is an alkyl group having from 1 to 6 carbon atoms; the remainder of the R substituents being fluorine.

3. A compound in accordance with claim 1 wherein one of the R substituents is a perfluoroalkyl group having from 1 to 6 carbon atoms; the remainder of the R substituents being fluorine.

4. A compound in accordance with claim 1 where one of the R substituents is phenyl, the remainder of the R substituents being fluorine.

5. A compound in accordance with claim 1 wherein one of the R substituents is perfluorophenyl, the remainder of the R substituents being fluorine.

6. Pentafluorophenyl azide.

No references cited.

WALTER A. MODANCE, *Primary Examiner.*
JOHN D. RANDOLPH, *Examiner.*